(12) United States Patent
Asari et al.

(10) Patent No.: US 10,664,180 B2
(45) Date of Patent: May 26, 2020

(54) SEMICONDUCTOR DEVICE, SECURITY PROCESS EXECUTION DEVICE, AND SECURITY PROCESS EXECUTION METHOD

(71) Applicant: Renesas Electronics Corporation, Tokyo (JP)

(72) Inventors: Shinsuke Asari, Tokyo (JP); Kenichi Ito, Tokyo (JP); Yuki Mori, Tokyo (JP); Shigemasa Shiota, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 36 days.

(21) Appl. No.: 15/826,809

(22) Filed: Nov. 30, 2017

(65) Prior Publication Data

US 2018/0181331 A1 Jun. 28, 2018

(30) Foreign Application Priority Data

Dec. 28, 2016 (JP) .................................. 2016-255704

(51) Int. Cl.
| | |
|---|---|
| *G06F 3/06* | (2006.01) |
| *G06F 21/62* | (2013.01) |
| *G06F 12/0875* | (2016.01) |
| *G06F 12/14* | (2006.01) |
| *G06F 21/79* | (2013.01) |

(52) U.S. Cl.
CPC .......... *G06F 3/0622* (2013.01); *G06F 3/0638* (2013.01); *G06F 3/0679* (2013.01); *G06F 12/0875* (2013.01); *G06F 21/6218* (2013.01); *G06F 21/79* (2013.01); *G06F 12/1433* (2013.01); *G06F 2212/1024* (2013.01); *G06F 2212/1052* (2013.01); *G06F 2212/402* (2013.01)

(58) Field of Classification Search
CPC .... G06F 3/0622; G06F 3/0638; G06F 3/0679; G06F 12/14; G06F 12/6218; G06F 12/79
See application file for complete search history.

(56) References Cited

U.S. PATENT DOCUMENTS

| | | | |
|---|---|---|---|
| 9,076,001 B1* | 7/2015 | Jagmag | G06F 21/74 |
| 2004/0165413 A1* | 8/2004 | Takagi | G06F 21/77 |
| | | | 365/148 |
| 2008/0244211 A1 | 10/2008 | Ito | |
| 2012/0233227 A1* | 9/2012 | Alexander | G06F 16/13 |
| | | | 707/827 |

(Continued)

FOREIGN PATENT DOCUMENTS

JP 2008-090519 A 4/2008

*Primary Examiner* — Nanci N Wong
(74) *Attorney, Agent, or Firm* — McDermott Will & Emery LLP

(57) ABSTRACT

It is possible to prevent a central processing unit and a security processing unit from accessing of a non-volatile memory at the same time. A data flash 13 includes a secure area 31 and a user area 32. In the secure area 31, a plurality of pieces of security information used in a security process is stored. A security IP 12 reads out a portion of the plurality of pieces of security information from the secure area 31 and stores it in the secure RAM 22. When the security information to be used in the security process is stored in the secure RAM, the security IP 12 reads out the security information from the secure RAM 22 and uses it.

15 Claims, 12 Drawing Sheets

(56) References Cited

U.S. PATENT DOCUMENTS

2014/0223079 A1* 8/2014 Zhang ................ G06F 12/0246
711/103
2016/0092376 A1* 3/2016 Kim .................... G06F 21/6218
711/163
2017/0139642 A1* 5/2017 Tan ..................... G06F 12/0246

* cited by examiner

SECURITY INFORMATION MANAGEMENT TABLE

| Security_info_0 | PROCESS A, PROCESS C |
|---|---|
| Security_info_1 | PROCESS F |
| Security_info_2 | PROCESS B |
| Security_info_3 | PROCESS D |
| Security_info_4 | PROCESS E |

SEMICONDUCTOR DEVICE, SECURITY PROCESS EXECUTION DEVICE, AND SECURITY PROCESS EXECUTION METHOD

CROSS-REFERENCE TO RELATED APPLICATIONS

This application is based upon and claims the benefit of priority from Japanese patent application No. 2016-255704, filed on Dec. 28, 2016, the disclosure of which is incorporated herein in its entirety by reference.

BACKGROUND

The present disclosure relates to a semiconductor device and a security process execution device, for example, a security process execution device which executes a security process using security information, and a semiconductor device including a security process execution device of that kind.

Further, the present disclosure relates to a security process execution method for a security process execution device.

Japanese Unexamined. Patent Publication No. 2008-90519 discloses a storage device (non-volatile memory) in which a writing operation according to a security level can be executed. A non-volatile memory disclosed in Japanese Unexamined Patent Publication No. 2008-90519 comprises a plurality of storage areas provided so as to correspond to security levels. In the non-volatile memory disclosed in Japanese Unexamined Patent Publication No. 2008-90519, the storage areas include a secure area and a general area. In the secure area, information relating to security such as key information is stored. A secure module, which executes a process relating to security, can access both the secure area and the general area. On the other hand, MPU (MicroProcessor Unit), which executes general processes, can access the general area, but cannot access the secure area.

SUMMARY

However, in Japanese Unexamined Patent Publication No. 2008-90519, when the secure area and the general area of the non-volatile memory are physically provided in a same macro, there is a problem that, the MPU cannot access the general area when the secure module is accessing the secure area.

Other problems of the related art and new features of the present disclosure will become apparent from the following descriptions of the specification and attached drawings.

According to an example aspect, a semiconductor device comprises a central processing unit, a security processing unit, a non-volatile memory having a secure area and a user area, and a secure memory, and wherein the security processing unit reads out a portion of a plurality of pieces of secure information from the secure area and stores it in the secure memory, and when security information to be used in a security process is stored in the secure memory, the security processing unit reads out the security information from the secure memory and uses it.

According to the above example aspect, while a security processing unit executes a process using security information, a central processing unit included in a semiconductor device can access a general area of a non-volatile memory.

BRIEF DESCRIPTION OF THE DRAWINGS

The above and other aspects, advantages and features of the present disclosure will be more apparent from the following description of certain embodiments thereof taken in conjunction with the accompanying drawings, in which.

DETAILED DESCRIPTION

Figure 1:
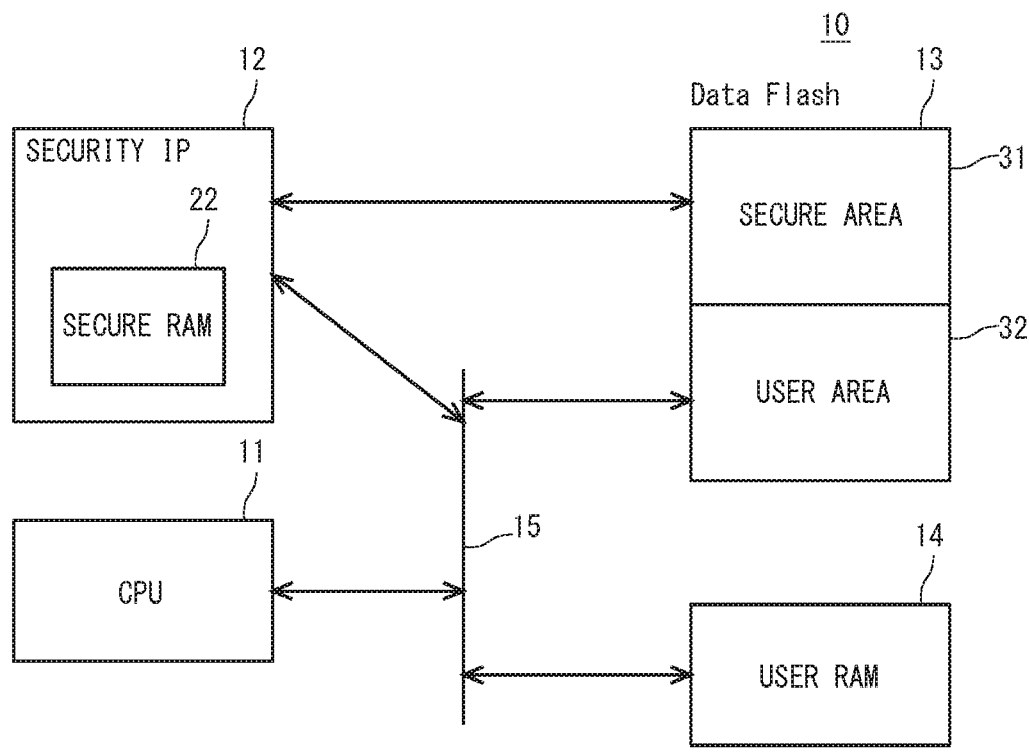
FIG. 1 is a block diagram showing a semiconductor device accord ng a first embodiment.

Hereinafter, embodiments incorporating means for solving the above-described problems will be described in detail with reference to the drawings. For the clarification of the description, some of the following description and the drawings may be omitted or simplified as appropriate. Further, each element shown in the drawings as functional blocks that perform various kinds of processing can be formed of a CPU (Central Processing Unit), a memory, and other circuits in hardware and may be implemented by programs loaded in the memory in software. Those skilled in the art will therefore understand that these functional blocks may be implemented in various ways by only hardware, only software, or a combination thereof without any limitation. Throughout the drawings, the same components are denoted by the same reference symbols and overlapping descriptions will be omitted as appropriate.

The above program can be stored and provided to a computer using any type of non-transitory computer readable medium. Non-transitory computer readable medium include any type of tangible storage medium. Examples of non-transitory computer readable medium include magnetic storage medium (such as floppy disks, magnetic tapes, hard disk drives, etc.), optical magnetic storage medium (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable medium. Examples of transitory computer readable medium include electric signals, optical signals, and electromagnetic waves. Transitory computer readable medium can provide the program to a computer via a wired communication line (e.g. electric wires, and optical fibers) or a wireless communication line.

The present disclosure will be described by dividing it into a plurality of sections or embodiments whenever circumstances require it for convenience in the following embodiments. However, unless otherwise particularly specified, these sections or embodiments may be not irrelevant to one another. One section or embodiment may be related to modifications, applications, details, supplementary explanations, and the like of some or all of the other ones. When reference is made to the number of elements or the like (including the number of pieces, numerical values, quantity, range, etc.) in the following embodiments, the number thereof is not limited to a specific number and may be greater than or less than or equal to the specific number unless otherwise particularly specified and definitely limited to the specific number in principle.

Further, in the following embodiments, components (including operation steps, etc.) are not always essential unless otherwise particularly specified and considered to be definitely essential in principle. Similarly, when reference is made to the shapes, positional relations, or the like of the components or the like in the following embodiments, they will include ones, for example, substantially approximate or similar in their shapes or the like unless otherwise particularly specified and considered not to be definitely so in principle. This is similarly applicable even to the above-described number or the like (including the number of pieces, numerical values, quantity, range, etc.).

First Embodiment

FIG. 1 shows a semiconductor device according a first embodiment. A semiconductor device 10 comprises a CPU 11, a security IP (intellectual property) 12, a data flash 13, and a user RAM 14. In the semiconductor device 10, these elements are connected to each other via a bus 15. The semiconductor device 10 is configured as, for example, a micro controller unit (ECU) having a security function. The semiconductor device 10 may be configured as, specifically, a microcomputer equipped a security IP for an ECU (Electronic Control Unit) for an automobile.

The CPU 11 carries out various processes according to user programs (user applications). The user RAM 14 is a volatile memory, and the CPU 11 utilizes the user RAM 14, for example, as a working area when executing various kinds of processing. The security IP 12 is a security processing unit (security process execution device), and executes a security process using security information. For example, the CPU 11 requests (instructs) the security IP 12 to execute the security process. Upon receiving an instruction from the CPU 11, the security IP 12 executes the security process instructed.

The data flash 13 is a non-volatile memory, and comprises a secure area 31 and a user area 32, which are logically divided. The secure area 31 is an area which the security IP 12 can access but the CPU 11 cannot directly access. The user area 32 is accessible from both the CPU 11 and the security IP 12. In the secure area 31, a plurality of pieces of the security key information (hereinafter, it may be simply referred to as key information) used in the security IP 12, other information, and the like are stored. In the user area 32, for example, data utilized by user programs executed by the CPU 11 are stored.

The security IP 12 comprises a secure RAM (secure memory) 22, which is a volatile memory. The secure RAM 22 is a memory which the security IP 12 can access but the CPU 11 cannot directly access. The security IP 12 reads out a portion of a plurality of pieces of the key information from the secure area 31 of the data flash 13, and stores the portion of the key information read out in the secure RAM 22. When the key information to be used in the security process is stored in the secure RAM 22, the security IP 12 reads out the key information from the secure RAM 22 and uses it. It should be noted that although the secure RAM 22 may be accessible only from the security IP 12, it is not necessarily built in the security IP 12.

Security IP

Figure 2:
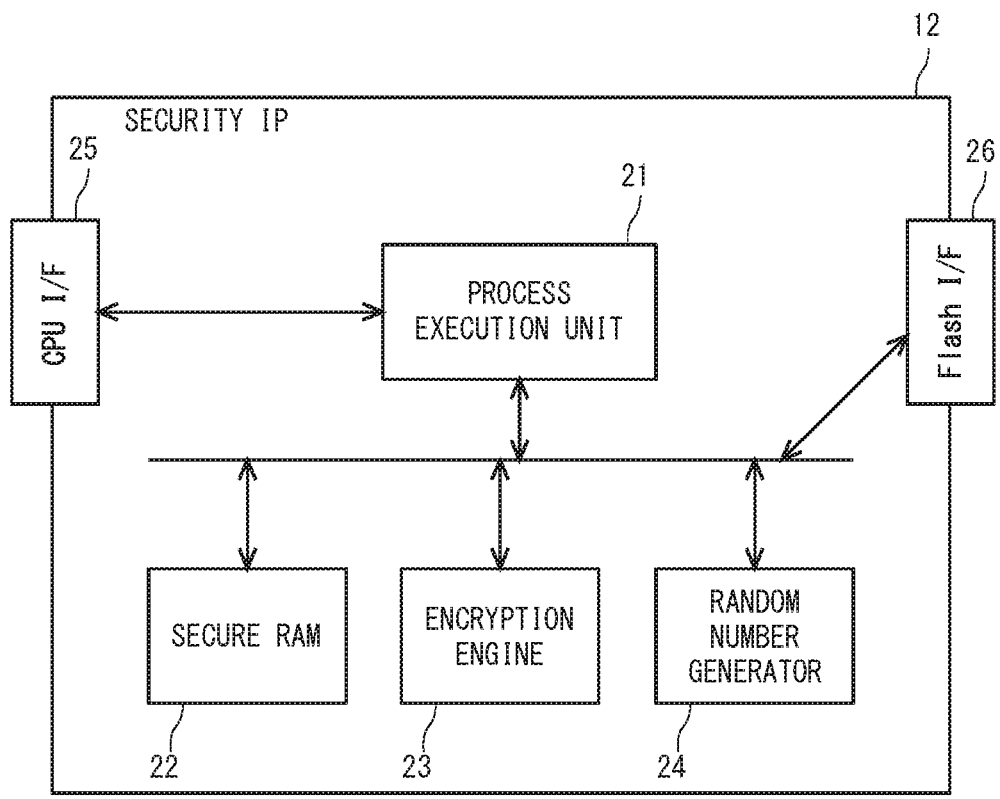
FIG. 2 is a block diagram showing a configuration of a security IP.

FIG. 2 shows a configuration of the security IP. The security IP 12 comprises, for example, a process execution unit 21, a secure RAM 22, an encryption engine 23, a random number generator 24, a CPU interface 25, and a flash interface 26. The CPU interface 25 is an interface for connecting the security IP 12 and the CPU 11 to each other (refer to FIG. 1). In addition, the flash interface 26 is an interface for connecting the security IP 12 and the data flash 13 to each other.

The process execution unit (security process execution unit) 21 controls an execution of various security processes. The encryption engine 23 executes a process relating to encryption. The random number generator 24 generates a random number. The process execution unit 21 executes various security processes including an encryption process, a decryption process, random number generation, and the like, using the encryption engine 23, a random number generator 24, and the like. The process execution unit 21 includes, for example, at least one of a sequencer and a processor (CPU). When the process execution unit 21 includes a processor, this processor may execute the security process, for example, reading out a program from the secure area 31 of the data flash 13 and executing the program.

The process execution unit 21 communicates with the CPU 11 through the CPU interface 25. The CPU 11 requests (instructs) the process execution unit 21 to store (copy) specific key information in the secure RAM. In the instruction, the CPU 11 designates the key information to be stored in the secure RAM 22. When the process execution unit 21 is instructed by the CPU 11 to copy the key information, the process execution unit 21 accesses the data flash 13 through the flash interface 26, acquires the key information designated from the secure area 31, and stores (registers) it in the secure RAM 22.

Further, the CPU 11 instructs the process execution unit 21 to execute the security process. When the process execution unit 21 is instructed by the CPU 11 to execute the security process, the process execution unit 21 executes the security process instructed. When the key information to be used in the security process is stored in the secure RAM 22, the process execution unit 21 executes the security process using the key information stored in the secure RAM 22. The instruction for copying the key information into the secure RAM 22, is carried out, for example, before the process execution unit 21 executes the security process using the key information.

Secure Area of Data Flash

Figure 3:
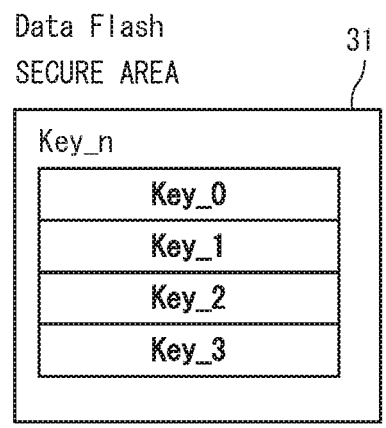
FIG. 3 is a diagram showing data stored in a secure area of a data flash.

FIG. 3 shows data stored in the secure area 31 of the data flash 13. The secure area 31 stores a plurality of pieces of the key information. In the FIG. 3, four pieces of the key information of Key_0 to Key_3 are shown as the key information. Hereinafter, the key information (its body) may be referred to as Key_n, where n is an integer of 0 or more.

Secure RAM

Figure 4:
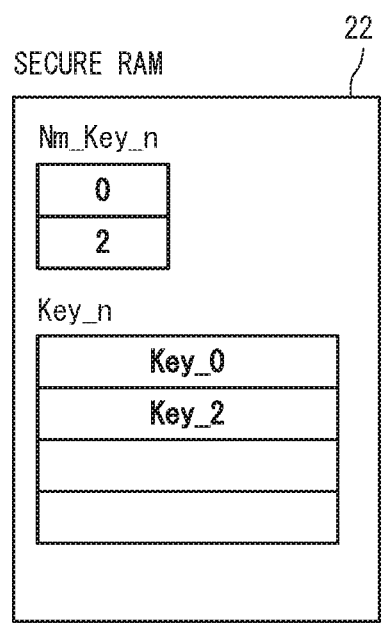
FIG. 4 is a diagram showing data stored in a secure RAM.

FIG. 4 shows data stored in the secure RAM. The secure RAM 22 comprises a plurality of slots for storing Key information Key_n. The process execution unit 21 copies a portion of a plurality of pieces of the key information from, the secure area 31 of the data flash 13, and stores it in the slot of the secure RAM 22. Further, the process execution unit 21 associates identification information of the key information to be stored in each slot of the secure RAM 22 with the slot, and further stores the identification information in the secure RAM 22. In the following description, it is assumed that a key number is used as the identification information. In addition, in the following description, the key number may be referred to as N_Key_n.

In an example shown in FIG. 4, the key information Key_0, and Key_2 are stored in the two slots of the secure RAM 22, and numbers '0' and '2' are stored as the key number Nm_Key_n corresponding to these slots. By referring to the key number Nm_Key_n of the secure RAM 22, it is possible to recognize which key information is stored in the secure RAM 22. For example, the process execution unit 21 stores the key number Nm_Key_n in the secure RAM 22 before storing the key information Key_n in the secure RAM 22. The process execution unit 21 reads out the key information Key_n corresponding to the key number Nm_Key_n stored in the secure RAM 22 from the secure area 31 of the data flash 13, and stores the key information Key_n in the secure RAM 22.

When changing the key information stored in the secure RAM 22, the CPU 11 instructs the security IP 12 to clear data stored in the secure RAM 22, and then instructs it to store new key information. When the security IP 12 is instructed by the CPU 11 to clear the secure RAM 22, the security IP 12 deletes the key number Nm_Key_n and the key information Key_n stored in the secure RAM 22. After deleting the key number Nm_Key_n and the key information Key_n, the security IP 12 stores a new key number Nm_Key$_n$ designated by the CPU 11 in the secure RAM 22, acquires the key information Key_n corresponding to the stored key number from the secure area 31 of the data flash 13, and stores it in the secure RAM 22.

Registration of Key Number

Figure 5:
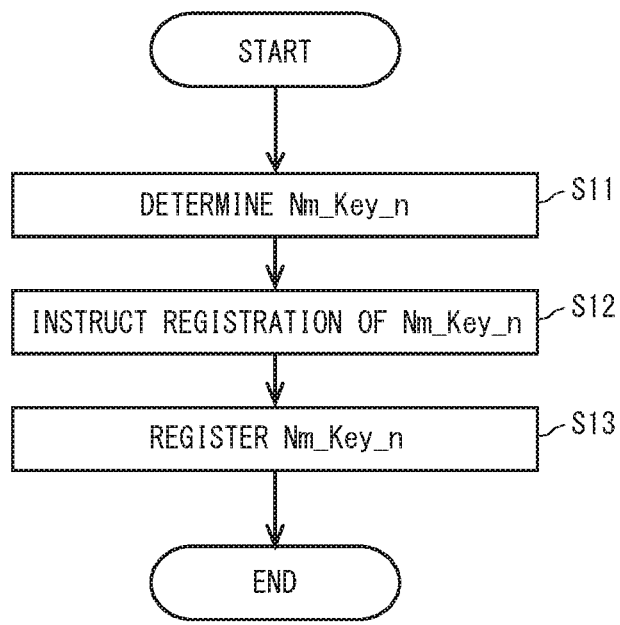
FIG. 5 is a flow chart showing a procedure for registering identification information of data to be stored in a secure RAM.

In the following description, an operation procedure is explained. Firstly, an operation (hereinafter, this operation may be referred to as Buffer Config) in which the key number Nm_Key_n is stored (registered) in the secure RAM 22 is explained. FIG. 5 shows a procedure for registering the key number in the secure RAM 22. The CPU (an application executed thereon) 11 determines a number of the key information (key number Nm_Key_n) to be registered in the secure RAM 22 (Step S11). At Step S11, the CPU 11 determines a number of the key information to be used in the security process, which a user application, for example, to be executed later will request the security IP 12 to execute.

Since the CPU 11 cannot directly access the secure RAM 22, registration of the key number Nm_Key_n in the secure RAM 22 needs to be carried out by the security IP 12. The CPU 11 transmits a signal to the security IP 12 for instructing it to register the key number Nm_Key_n determined at Step S11 (Step S12). In this signal, the key number Nm_Key_n determined at Step S11 is included.

The process execution unit 21 (refer to FIG. 2) of the security IP 12 receives the signal transmitted by the CPU 11 through the CPU interface 25. Upon receiving the signal for instructing registration of the key number Nm_Key_n from the CPU 11 the process execution unit 21 registers the key number Nm_Key_n in the secure RAM 22 (Step S13). When the key numbers '0' and '2' are included in the signal (instruction) transmitted at Step S12, the process execution unit 21 stores these key numbers in an area of the secure RAM 22 for storing the key number Nm_Key_n.

Registration of Key Information

Figure 6:
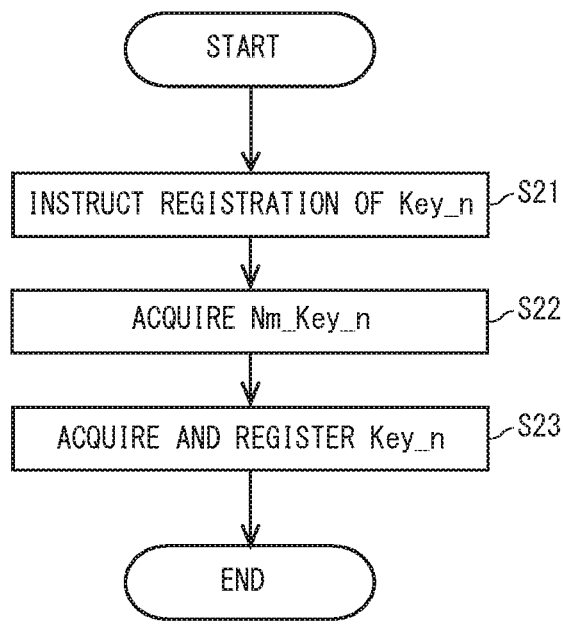
FIG. 6 is a flow chart showing a procedure for registering data in a secure RAM.

Next, an operation (hereinafter, this operation may be referred to as Buffer Exec) in which the key information Key_n is registered in the secure RAM 22 is explained. FIG. 6 shows a procedure for registering the key information in the secure RAM 22. The Buffer Exec is executed after Buffer Config is executed. The CPU 11 transmits a signal to the security IP 12 for instructing it to register the key information Key_n corresponding to the key number Nm_Key_n (Step S21). For example, the CPU 11 executes Buffer Config in an initial setting operation before executing an application to register the key number Nm_Key_n in the secure RAM 22, and then instructs the security IP 12 to register the key information.

The process execution unit 21 (refer to FIG. 2) of the security IP 12 receives the signal transmitted by the CPU 11 through the CPU interface 25. Upon receiving the signal for instructing registration of the key information Key_n from the CPU 11, the process execution unit 21 refers to the key number Nm_Key_n of the secure RAM 22, and acquires the key information Key_n corresponding to the key number from the secure area 31 of the data flash 13 (Step S22). The process execution unit 21 registers the key information Key_n acquired in the secure RAM 22 (Step S23).

At Step S22, for example, the process execution unit 21 firstly refers to key number Nm_Key_n of the secure RAM 22 and acquires the key number '0'. Then, the process execution unit 21 accesses the data flash 13 through the flash interface 26 and acquires the key information Key_0 corresponding to the key number '0' from the secure area 31. At Step S23, the process execution unit 21 registers the key information Key_0 acquired at Step S22 in the secure RAM 22.

When a plurality of the key numbers Nm_Key_n are registered in the secure RAM 22, the process execution unit 21 acquires the key information corresponding to those key numbers from the secure area 31 and registers it in the secure RAM 22. For example, the process execution unit 21 selects key numbers stored in the key number $Nm_{13}$ Kev_n of the secure RAM 22 one by one, and repeatedly executes Step S22 and Step S23 until all of the key numbers are selected.

Note that, although an example is explained above in which the key number Nm_Key_n is antecedently registered in the secure RAM 22 and the key information. Key_n is registered in the secure RAM 22 afterwards, either registration of the key number or registration of the key information may be carried out first. For example, the CPU 11 may instruct the registration of the key information designating the key number, and the security IP 12 may acquire the key information of the key number designated from the secure area 31 and register it in the secure RAM 22. In this case, the security IP 12 may register the key number of the key information registered in the secure RAM 22 after the registration of the key information or may register the key number simultaneously with the key information.

Security Process

Figure 7:
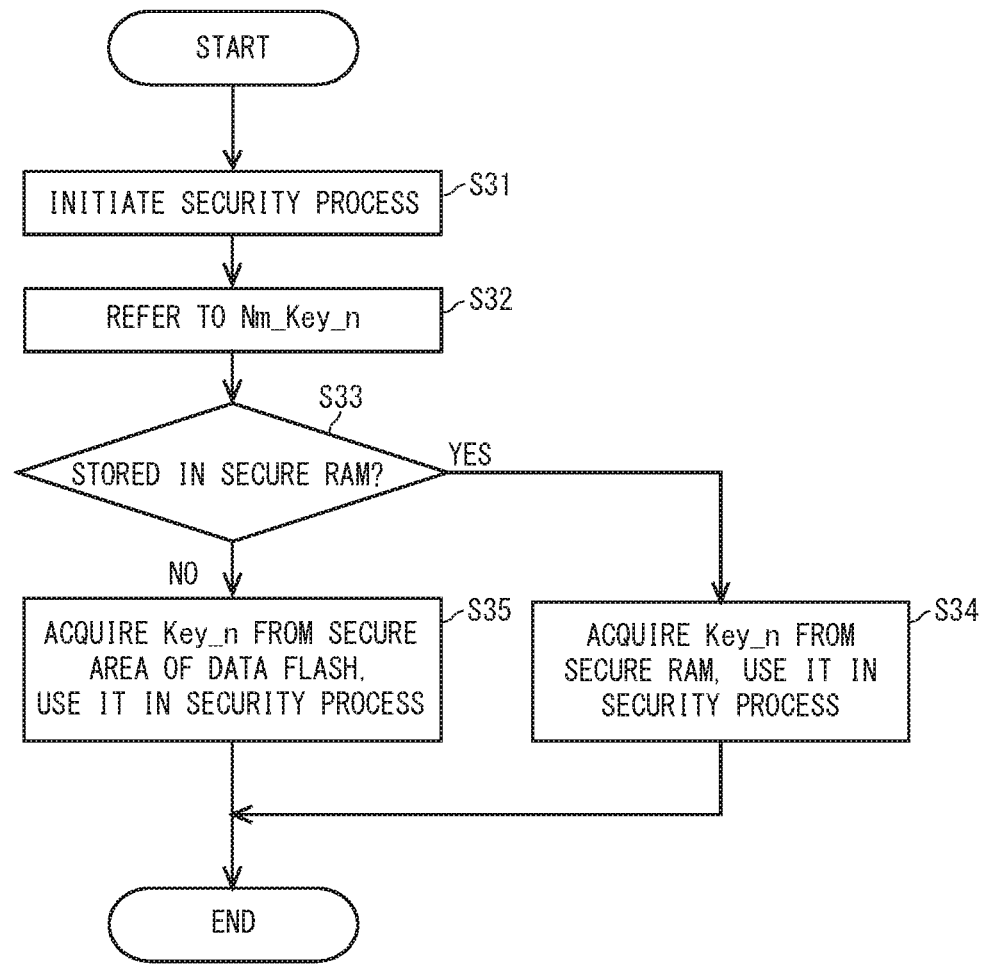
FIG. 7 is a flow chart showing a procedure for a security process.

Next, the security process using the secure RAM 22 is explained. FIG. 7 shows a procedure for the security process, user application executed on the CPU 11 requests (instructs) the security IP 12 to execute the security process using the key information such as encryption or decryption. Upon receiving an instruction through the CPU interface 25, the process execution unit 21 of the security IP 12 initiates the security process instructed ((Step S31).

The process execution unit 21, when using the key information, refers to the key number Nm_Key_n of the secure RAM 22 (Step S32), and determines whether the key information to be used is registered in the secure RAM 22 or not (Step S33). When the process execution unit 21 determines that the key information is registered in the secure RAM 22, it acquires the key information Key_n from the secure RAM 22 and uses it in the security process (Step S34). When determining that the key information to be used in the security process is not registered in the secure RAM 22, the process execution unit 21 accesses the data flash 13 through the flash interface 26, reads out the key information Key_n from the secure area 31, and uses it (Step S35).

It should be noted that, after instructing the security IP 12 to execute the security process, the user application (CPU 11) may resume the operation of the user application before the security process has finished. The CPU 11 accesses the user area 32 of the data flash 13 in the operation of the user application. When the key information used by the security IP 12 in the security process is registered in the secure RAM 22, the security IP 12 does not need to access the secure area 31 of the data flash 13 in the security process. In this way, an access of the CPU 11 to the data flash 13 and an access of the security IP 12 to the data flash 13 do not occur at the same time, and thus a situation in which one of the accesses is forced to wait until the other of the accesses ends does not occur.

Overall Processing Flow

Figure 8:
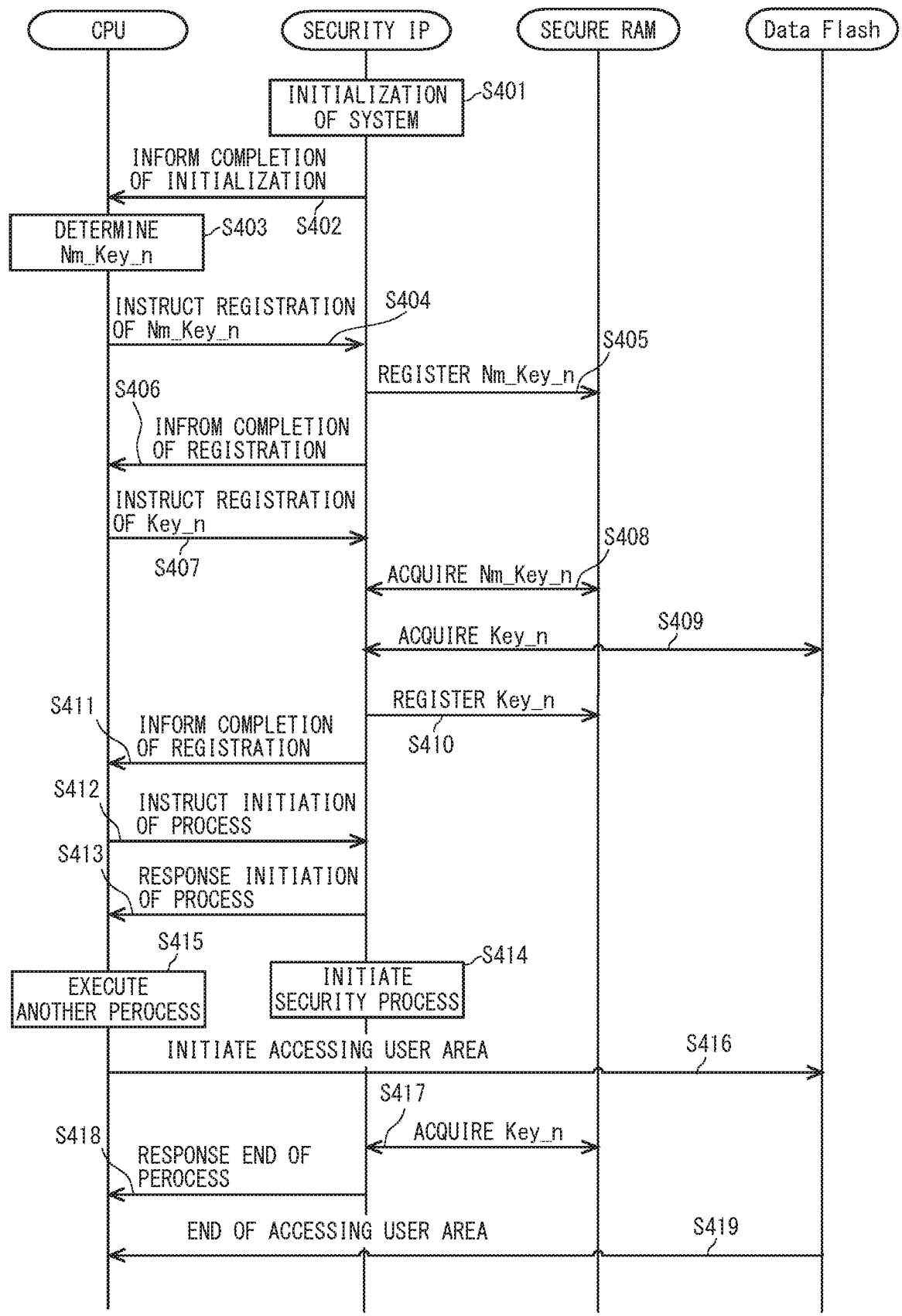
FIG. 8 is a sequence diagram showing a flow of a procedure in a semiconductor device.

Further, an overall processing flow in the semiconductor device 10 is explained. FIG. 8 shows a flow of a process in the semiconductor device 10. When the semiconductor device 10 is turned on or reset, the security IP 12 carries out an initialization of the system (Step S401). In this initialization, for example, authenticity of the semiconductor device 10 and the like are verified. The initialization of the system carried out by the security IP 12 may include accessing of the data flash 13. When the initialization has been finished, the security IP 12 notifies the CPU 11 of that (Step S402).

Upon receiving a notification of completion of the initialization, the CPU 11 determines the number (key number Nm_Key_n) of the key information to be stored in the secure RAM 22 (Step S403). The CPU 11 instructs the security IP 12 to register the key number Nm_Key_n determined (Step S404). The security IP 12 registers the key number Nm_Key_n designated in the secure RAM 22 (Step S405). When the registration of the key number Nm_Key_n is completed, the security IP 12 notifies the CPU 11 of that (Step S406). The Operation from Step S403 to Step S406 corresponds to the operation of Buffer Config shown in FIG. 5.

Upon receiving a notification of completion of the registration of the key number Nm_Key_n, the CPU 11 instructs the security IP 12 to register the key information Key_n (Step S407). The security IP 12 accesses the secure RAM 22 and acquires the key number Nm_Key_n from the secure RA 22 (Step S408). After that, the security IP 12 initiates accessing of the data flash 13, and acquires, from the secure area 31, the key information Key_n corresponding to the key number Nm_Key_n acquired (Step S409). The security IP 12 registers the key information Key_n acquired from the secure area 31 in the secure RAM 22 (Step S410). When the registration of the key information Key_n corresponding to all of the key numbers Nm_Key_n acquired is completed, the security IP 12 notifies the CPU 11 of that (Step S411). The operation from Step S407 to Step S411 corresponds to the operation of the Buffer exec shown in FIG. 6.

Upon receiving a notification of completion of the registration of the key information, the CPU 11 initiates, for example, a process of a user application. The CPU 11 instructs (requests) the security IP 12 to execute the security process, for example, in the process of the user application (Step S412). Upon receiving an instruction for process execution, the security IP 12 transmits a response indicating an initiation of the security process to the CPU 11 (Step S413), and initiates the security process (S414). The CPU 11 executes another process in the user application after the security process is initiated (Step S415). The CPU 11 initiates accessing of the user area 32 of the data flash 13 in another process (Step S416).

In the security process, the security IP 12 accesses the secure RAM 22 in a situation requiring the use of the key information Key_n, and acquires the key information Key_n from the secure RAM 22 (Step S417). Since the key information Key_n is registered in the secure RAM 22 beforehand, the security IP 12 can acquire the key information Key_n from the secure RAM 22 without accessing of the data flash 13. In this way, the access of the CPU 11 to the user area 32 of the data flash 13 is not interfered with by the access of the security IP 12 to the secure area 31 of the data flash 13.

When the security process is completed, the security IP 12 notifies the CPU 11 of that (Step S418). The CPU 11 ends accessing of the user area 32 of the data flash 13 at any tinting (Step S419), and ends the process of the user application.

Summary

In the present embodiment, the CPU 11 instructs the security IP 12 to register specific key information in the secure RAM 22. The security IP 12 copies the designated key information from the secure area 31 of the data flash 13 and registers it in the secure RAM 22 in accordance with the instruction of the CPU 11. When the CPU 11 instructs the security IP 12 to execute the security process in which the key information copied to the secure RAM 22 is used, the security IP 12 reads out the key information from the secure RAM 22 and uses it in the security process. In the present embodiment, by registering the key information to be used in the security process in the secure RAM 22, the security IP 12 can acquire and use the key information without accessing of the data flash 13 during the execution of the security process.

For example, in a case where the security IP 12 acquires the key information from, the secure area 31 of the data flash 13 and uses it, the CPU 11 is not able to access the user area 32 of the data flash 13 while the security IP 12 accesses the data flash 13. Conversely, when the CPU 11 accesses the user area 32 of the data flash 13, the security IP 12 is not able to access the secure area 31 and user area 32 of the data flash 13. In order to make it possible for the security IP 12 to acquire the key information from the secure area 31, either interrupting the access of the CPU 11, or delaying the security process until the access of the CPU 11 has finished is required.

In the present embodiment, by copying the key information to be used in the security process into the secure RAM 22, during the execution of the security process, an access of the CPU 11 to the user area 32 of the data flash 13 and an access of the security IP 12 to the secure area 31 of the data flash 13 do not interfere with each other. In this way, it is possible to make the execution of the security process of the security IP 12 and the access of the CPU 11 to the user area 32 of the data flash 13 compatible with each other. For example, by copying the key information frequently used into the secure RAM, it is possible to avoid a situation where the process of the CPU 11 or the security process of the security IP 12 is often interrupted, whereby it is possible to improve real-time property.

Second Embodiment

Next, a second embodiment is explained. A hardware configuration of a semiconductor device according to the present embodiment may be the same as the configuration of the semiconductor device 10 shown in FIG. 1, which is explained in the first embodiment. In addition, a configuration of a security IP used in the present embodiment may be the same as the configuration of the security IP 12 shown in FIG. 2, which is explained in the first embodiment.

In the present embodiment, the security IP 12 stores the key information as a plurality of storage types in the secure RAM 22. The storage types of the key information include Buffer (First storage type) and Cache (Second storage type). The security IP 12 stores the key information Key_n in the secure RAM 22 as the storage type Buffer in the Buffer exec explained in the first embodiment. Further, the security IP 12 associates the key number Nm_Key_n with information indicating that the type of the storage of the key information in the secure RAM 22 is Buffer, and stores the key number Nm_Key_n in the secure RAM 22 in the Buffer Config.

As explained in the first embodiment, during the execution of the security process, the security IP 12 reads out the key information from the secure area 31 of the data flash 13 and uses it, when the key information to be used is not stored in the secure RAM 22. In the present embodiment, when the security IP 12 reads out the key information from the secure area 31 and uses it during the execution of the security process, the security IP 12 stores that key information in the secure RAM 22 as the storage type Cache. At this time, the security IP 12 associates the number (key number) of the key information stored with information indicating that the type of the storage of the key information in the secure RAM 22 is Cache, and stores the key number in the secure RAM 22. In this way, when the once used key information is used next time, the security IP 12 can acquire and use the key information without accessing of the data flash 13.

Secure RAM

Figure 9:
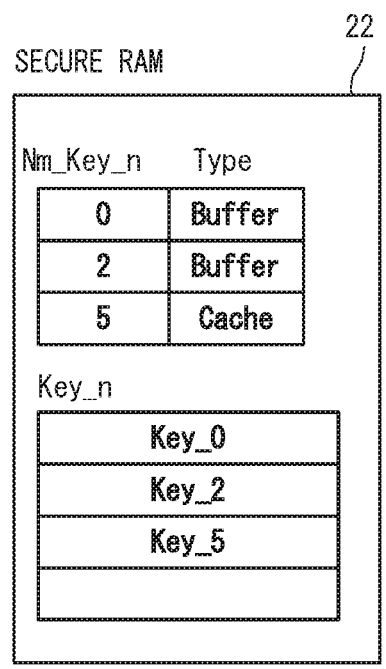
FIG. 9 is a diagram showing data stored in a secure RAM in a second embodiment.

FIG. 9 shows data stored in the secure RAM 22 in the present embodiment. One of difference between data stored in the secure RAM 22 in the present embodiment and data stored in the secure RAM 22 in the first embodiment shown in FIG. 4 is that the key number Nm_Key_n is stored in association with the storage type (type of the storage) Type. In the present embodiment, for example, among the plurality of slots for storing the key information which the secure RAM 22 comprises, a predetermined number of the slots are used for storing the key information as the storage type Buffer, and the remaining slots are used for storing the key information as the storage type Cache.

An example shown in FIG. 9, the key information Key_0, the key information Key_2, and the key information Key_5 are stored in the secure RAM 22. In addition, numbers '0', '2', and '5' are stored as the key number Nm_Key_n in the secure RAM 22. Further, as the type of the storage 'Type', the storage type Buffer is stored in the secure RAM 22 in association with the key number '0' and '2', and the storage type Cache is stored in the secure RAM 22 in association with the key number '5'. By referring to the storage type, it is possible to determine that the key information stored in the secure RAM 22 is key information stored via the Buffer Config and the Buffer Exec, or key information stored during the execution of the security process.

Operation Procedure

In the following description, an operation procedure is explained. In the present embodiment, the operation of the Buffer Config may be carried out by the same procedure as shown in FIG. 5. In the present embodiment, when storing the key number Nm_Key_n at Step S13 of FIG. 5, the security IP 12 associates the key number Nm_Key_n with the storage type Buffer and stores the key number Nm_Key_n in the secure RAM 22. In the present embodiment, the operation of the Buffer Exec may be carried out by the same procedure as shown in FIG. 6. In the Buffer Exec, the security IP 12 acquires the key information of the key number stored in association with the storage type Buffer from the secure area 31 and stores it in the secure RAM 22. It should be noted that the storage type Buffer may be stored in the secure RAM 22 in the Buffer Exec. Specifically, the storage type Buffer may be stored in the secure RAM 22 when the key information Key_n is registered in the secure RAM 22 at Step S23 of FIG. 6.

Security Process

Figure 10:
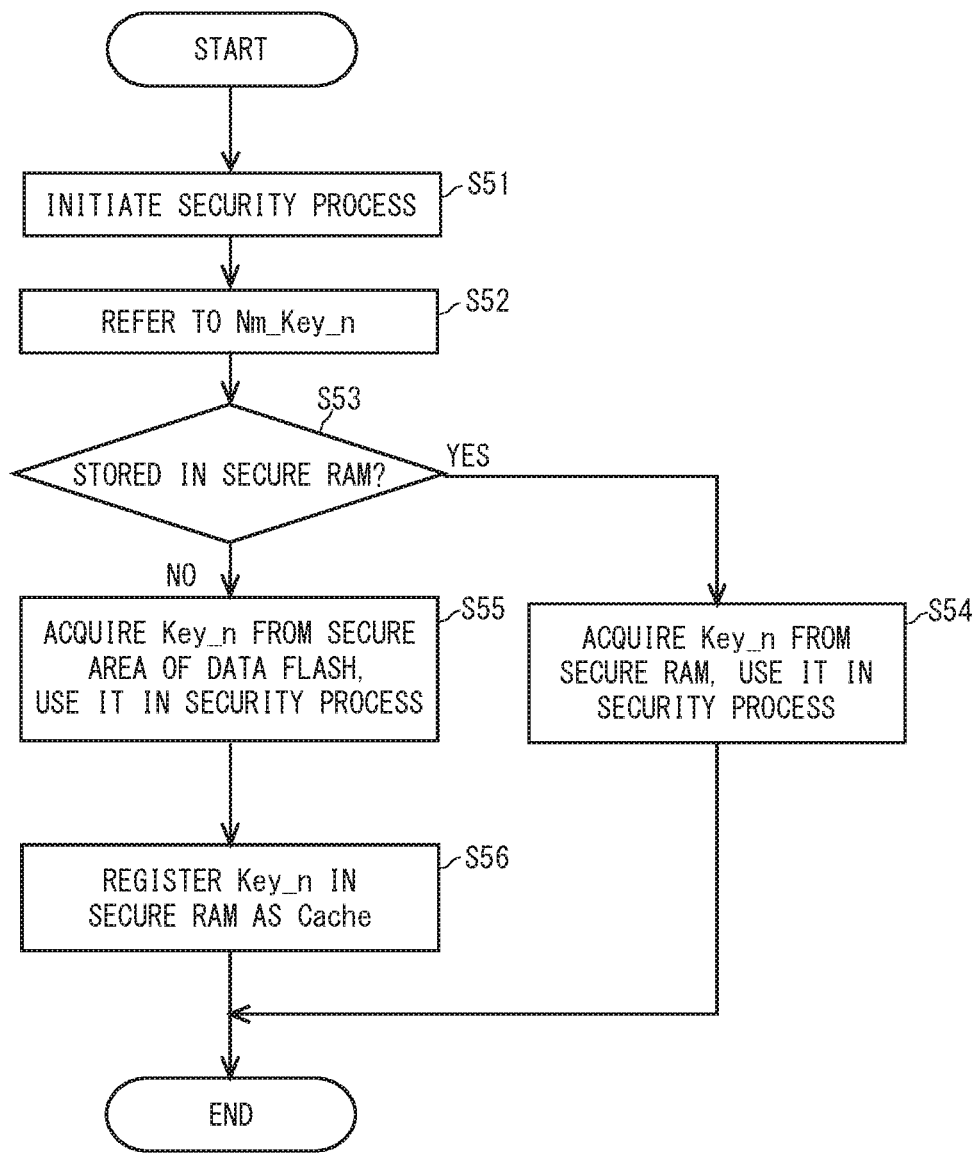
FIG. 10 is a flow chart showing a procedure for a security process.

FIG. 10 shows a procedure for the security process. The CPU 11 instructs the security IP 12 to execute the security process. The process execution unit 21 (refer to FIG. 2) of the security IP 12 receives the instruction through the CPU interface 25 and initiates the security process instructed (Step S51). When using the key information, the process execution unit 21 refers to the key number Nm_Key_n of the secure RAM 22 (Step S52), and determines whether the key information to be used is stored in the secure RAM 22 or not (Step S53).

When the process execution unit 21 determines that the key information is stored in the secure RAM 22 at Step S53, the process execution unit 21 acquires the key information Key_n from the secure RAM 22 and uses it in the security process (Step S54). At Step S54, the process execution unit 21 acquires the key information stored as the storage type Buffer or the storage type Cache from the secure RAM 22 and uses it. When the key information is acquired from the secure RAM 22, the process execution unit 21 can use the key information without accessing of the data flash 13.

On the other hand, when the process execution unit 21 determines that the key information to be used in the security process is not stored in the secure RAM 22 at Step S53, the process execution unit 21 accesses the data flash 13 through the flash interface 26, reads out the key information Key_n from the secure area 31, and uses it (Step S55). In addition, the process execution unit 21 stores the key information Key_n read out at Step S55 as the storage type Cache in the secure RAM 22 (Step S56). At Step S56, the process execution unit 21 stores the key information Key_n in an empty slot of the secure RAM 22, associates the key number Nm_Key_n of the key information stored with the storage type Cache, and stores the key number Nm_Key_n in the secure RAM 22. By storing the once used key information in the secure RAM 22 as the storage type Cache, when using the same key information next time, it is possible to acquire this key information from the secure RAM 22.

At Step S56, when there is no empty slot in the secure RAM 22, the process execution unit 21 may select a slot which stores the key information as storage type Cache and overwrite the key information stored in the selected slot with the key information newly acquired at Step S55. In this way, the key information stored as the storage type Buffer is not overwritten and can be kept stored in the secure RAM 22. Note that an algorithm for selecting a slot for overwriting is not limited to a particular one. The process execution unit 21 may select a slot, for example, which stores the key information having the oldest storing order of the key information as a slot for overwriting, and may overwrite that slot with the key information newly acquired. Alternatively, instead of selecting a slot for overwriting according to the storing order, the process execution unit 21 may store information of the frequency in use and select a slot for overwriting based on that information.

Summary

In the present embodiment, in addition to storing the key information as storage type Buffer in Buffer Config and Buffer Exec, the key information which the security IP 12 acquires from the secure area 31 of the data flash 13 and uses in the security process is stored in the secure RAM 22 as the storage type Cache. In this way, when using the same key information for multiple times, the security IP 12 can acquire the key information without accessing of the data flash 13. In particular, by storing the key information, use rate of which is high but not stored in the secure RAM 22 by the Buffer Config and the Buffer Exec, in the secure RAM 22 as the storage type Cache, the security IP 12 does not need to access the data flash 13 frequently in the security process.

Third Embodiment

Further, a third embodiment is explained. A hardware configuration of a semiconductor device according to the present embodiment may be the same as the configuration of the semiconductor device 10 shown in FIG. 1, which is explained in the first embodiment. In addition, a configuration of a security IP used in the present embodiment may be the same as the configuration of the security IP 12 shown in FIG. 2, which is explained in the first embodiment. In the following description, difference from the first embodiment is mainly explained. Note that, in the present embodiment, the key information may be stored in the secure RAM 22 as a plurality of storage types as the second embodiment.

In the first embodiment, the security IP 12 stores the key number Nm_Key_n designated by the CPU 11 in the secure RAM 22, acquires the key information Key_n of the key number Nm_Key_n stored from secure area 31 of the data flash 13, and registers it in the secure RAM 22. In the present embodiment, the security IP 12 registers, in the secure area 31 of the data flash 13, the key number of the key information to be registered in the secure RAM 22, acquires, from the secure area 31, the key information of the key number stored in the secure area 31, and stores it in the secure PAM 22.

Secure Area

Figure 11:
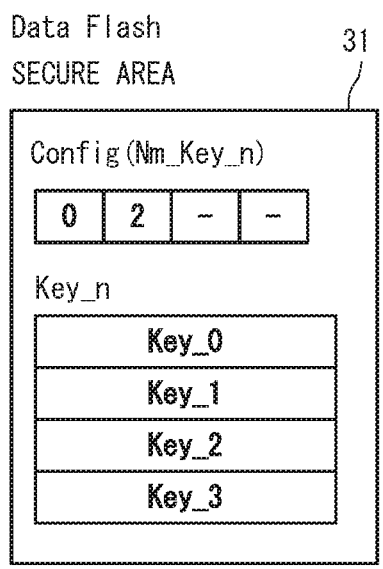
FIG. 11 is a diagram showing data stored in a secure area in a third embodiment.

FIG. 11 shows data stored in the secure area 31 of the data flash 13 in the present embodiment. One difference between the data stored in the secure area 31 in the present embodiment and the data stored in the secure area 31 shown in the FIG. 3 in the first embodiment is that setting information Config (Nm_Key_n) is added. The key number of the key information to be stored in the secure RAM 22 is stored in the setting information. Config (Nm_Key_n).

The security IP 12 reads out the setting information Config (Nm_Key_n) from the secure area 31. In an example of FIG. 11, key numbers '0' and '2' are stored in the setting information Config(Nm_Key_n) as the key number of the key information to be stored in the secure RAM 22. For example, the security IF 12 reads out the key numbers '0' and '2' from the secure area 31. The security IP 12 stores the read out key numbers '0' and '2' in the key number Nm_Key_n (refer to FIG. 4) of the secure RAM 22. Further, the security IP 12 acquires the key information Key_0 and Key_2 of the key number '0' and '2' from the secure area 31 and stores it in the secure RAM 22.

Registration of Setting Information

Figure 12:
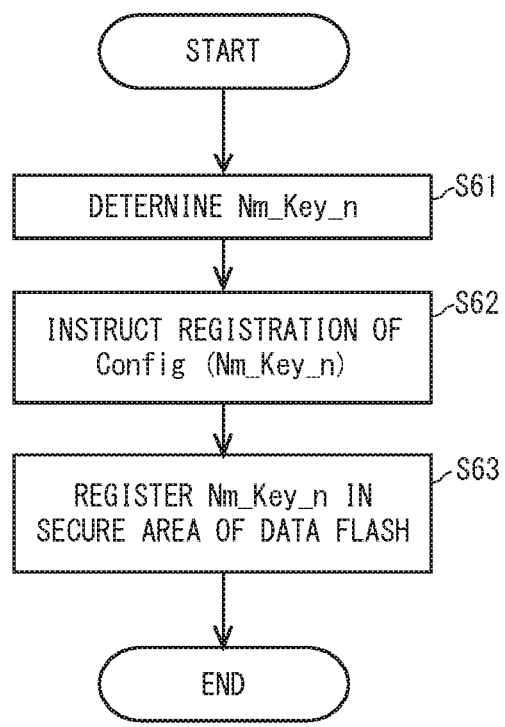
FIG. 12 is a flow chart showing a procedure for storing data in a secure area.

In the following description, an operation procedure is explained. Firstly, a procedure for registering (Config) the setting information Config (Nm_Key_n) in the secure area of the data flash 13 is explained. FIG. 12 shows a procedure for registering the setting information in the secure area 31. The CPU 11 determines the number (key number Nm_Key_n) of the key information to be registered in the secure RAM 22 (Step S61). The CPU 11 transmits a signal for instructing the security IP 12 to register the key number Nm_Key_n determined at Step S61 in the data flash 13 (Step S62). In this signal, the key number Nm_Key_n determined at Step S61 is included.

The process execution unit 21 (refer to FIG. 2) of the security IP 12 receives the signal transmitted by the CPU 11 through the CPU interface 25. Upon receiving the signal for instructing to register the key number Nm_Key_n in the data flash 13 from the CPU 11, the process execution unit 21 accesses the data flash 13 through the flash interface 26 and registers the key number Nm_Key_n in the secure area 31 (Step S63). For example, when the key numbers '0' and '2' are included in the signal (instruction) transmitted at Step S62, the process execution unit 21 stores these key numbers in the setting information Config (Nm_Key_n) of the secure area 31.

Registration of Key Information

Figure 13:
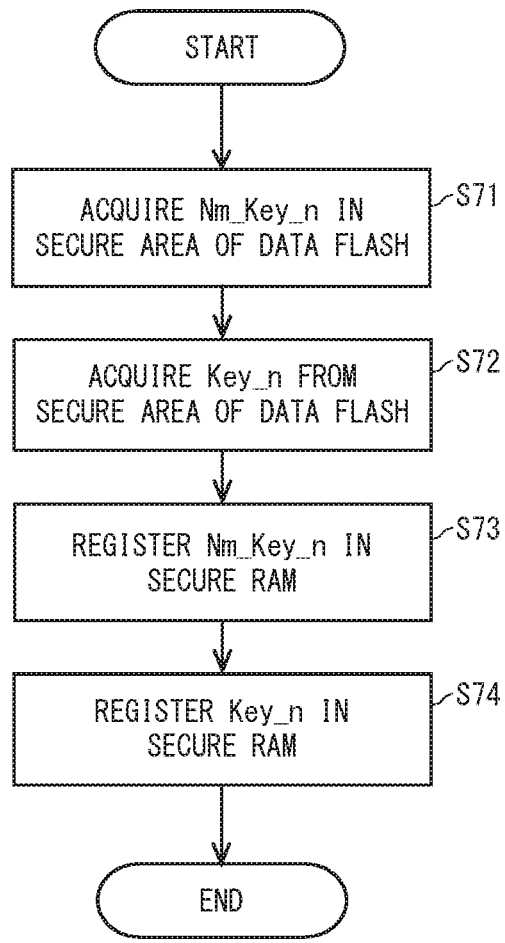
FIG. 13 is a flow chart showing a procedure for registering data is a secure RAM.

Next, a procedure for registering (Buffer) the key number and the key information in the secure RAM 22 is explained. FIG. 13 shows a procedure for registering the key number and the key information in the secure RAM 22. The process execution unit 21 (refer to FIG. 2) accesses the data flash 13 through the flash interface 26 and acquires the setting information Config (Nm_Key_n) from the secure area 31 (Step S71).

The process execution unit 21 acquires, from the secure area 31 of the data flash 13, the key information Key_n of the key number included in the setting information Config (Nm_Key_n) acquired at Step S71 (Step S72). The process execution unit 21 registers, in the secure RAM 22, the key number Nm_Key_n included in the setting information Config(Nm_Key_n) acquired at Step S71 (Step S73). Further, the process execution unit 21 registers the key information. Key_n acquired at Step S72 in the secure RAM 22 (Step S74).

The process execution unit 21 may carry out Step S71, for example, in the initialization of the system (refer to Step S401 of FIG. 8) and acquire the setting information. Config (Nm_Key_n) from the secure area 31 of the data flash 13. In this case, in the initialization, the key information designated by the setting information Config (Nm_Key_n) is automatically registered in the secure RAM 22 without an instruction of the CPU 11. In addition to registering the key number and the key information in the secure RAM 22 in the initialization of the system, the Buffer Config and the Buffer Exec may be separately carried out and the key number designated by the CPU 11 and the key information corresponding to the key number may be registered in the secure RAM 22.

Summary

In the present embodiment, the number (key number) of the key information to be used in the security process is registered in the secure area 31 of the data flash 13. Since the registration of the key number is carried out in the data flash 13, which is a non-volatile memory, the operation of the key number registration is required to be carried out only once. The security IP 12 acquires, from the secure area 31, the key information designated by the key number (setting information Config (Nm_Key_n)) registered in the secure area 31 and registers the key information in the secure RAM 22. By doing so, the security IP 12 can automatically acquire the key information from the secure area 31 of the data flash 13 and register it in the secure RAM 22 after the startup or the reset, even if the CPU 11 does not instruct the security IP 12 to register the key number and the key information every time after the startup or the reset.

Modified Embodiment

Next, a modified embodiment is explained. In each above described embodiment, an example in which the key information stored in the secure area 31 of the data flash 13 is cold into the secure RAM 22 and registered in the secure RAM 22 is explained. However, the present disclosure is not limited thereto. In each above described embodiment, any type of security information not limited to the key information may be registered in the secure RAM 22, and, when executing the security process, the security IP 12 may acquire the security information from the secure RAM 22 and use it.

Security Information

Figure 14:
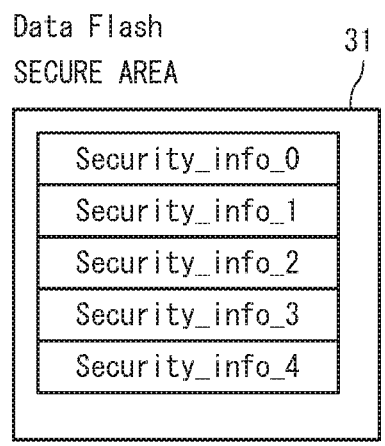
FIG. 14 is a diagram showing data stored in a secure area in a modified embodiment.

FIG. 14 shows data stored in the secure area 31 of the data flash 13 in the modified embodiment. The secure area 31 stores security information. Note that the security information means information, for example, to be used in the security process executed by the security IP 12 and required to be concealed. In FIG. 14, 5 pieces of security information of Security_info_0 to Security_info_4 are shown as the security information. In the following description, the security information (its body) may be referred to as Security-_info_n, where n is an integer of 0 or more.

Security Information Management Table

Figures 15, 16:
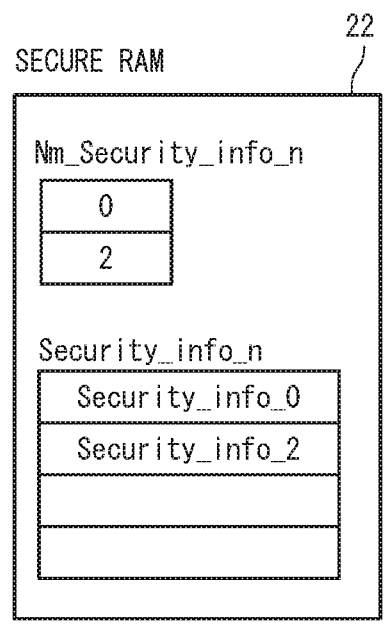
FIG. 15 is a diagram showing a security information management table.
FIG. 16 is a diagram showing data stored in a secure RAM.

FIG. 15 shows a security information management, table. The security information management table is a table for managing relationship between a process, included in a user application executed by the CPU 11, which includes an execution request of the security process and the security information used by the security IP 12 when the process is executed. The security information managing table is stored, for example, in the secure area 31 of the data flash 13.

For example, as shown in FIG. 15, the security information management table stores the security information Security_info_0 and a process A and a process C in association with each other, the security information Security_info_1 and a process F in association with each other, and the security information Security_info_2 and a process B in association with each other. Further, the security information management table stores the security information Security-_info_3 and a process D in association with each other, and the security information Security_info_4 and a process F in association with each other.

In the modified embodiment, the CPU 11 notifies the security IP 12 about a process, included in a user application, which includes the execution request of the security process. This notification is carried out, for example, before executing that process. Upon receiving the notification of the process to be executed, the security IP 12 refers to the security information management table and determines the security information to be registered in the secure RAM 22. For example, when the security IP 12 receives a notification about the process A from the CPU 11, the security IP 12 refers to the security information management table shown in FIG. 15, and determines to register the security information Security_info_0 in the secure RAM 22.

Secure RAM

FIG. 16 shows data stored in the secure RAM. The secure RAM 22 comprises a plurality of slots for storing the security information Security_info_n. The process execution unit 21 (refer to FIG. 2) of the security IP 12 copies a portion of a plurality of pieces of the security information from the secure area 31 of the data flash 13, and stores it in the slot of the secure RAM 22. Further, the process execution unit 21 associates identification information of the security information to be stored in each slot of the secure RAM 22 with the slot, and further stores the identification information in the secure RAM 22. The security information Security_info_n corresponds to the key information Key_n in the first embodiment, and identification number nm_Security_info_n corresponds to the key number Nm_Key_n in the first embodiment.

In an example shown in FIG. 16, security information Security_info_0 and Security_info_2 are stored in the two slots of the secure RAM 22, and numbers '0' and '2' are stored as the identification number Nm_Security_info_n corresponding these slots. By referring to the identification number Nm_Security_into_n of the secure RAM 22, it is possible to recognize which security information is copied into the secure RAM 22.

Registration of Security Information

Figure 17:
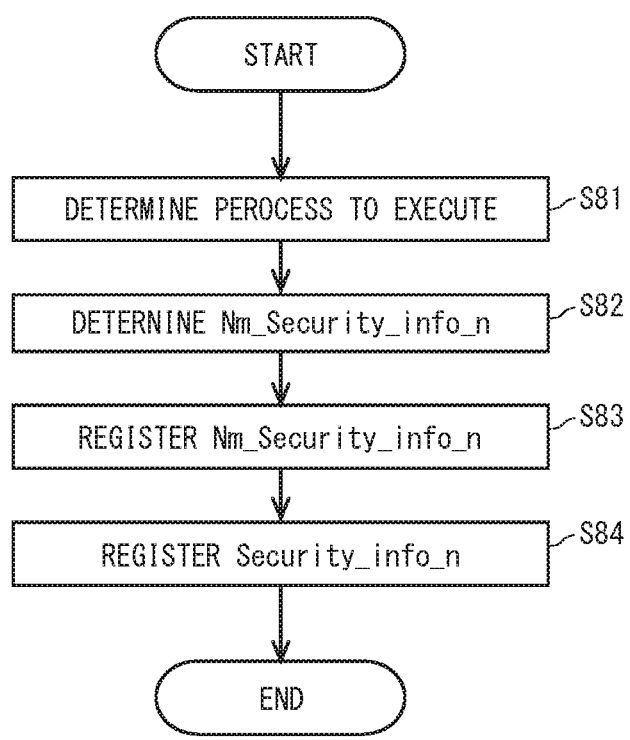
FIG. 17 is a flow chart showing a procedure for registering data in a secure RAM.

In the following description, an operation procedure in the modified embodiment is explained. Firstly, a procedure in which the security information is registered in the secure RAM 22 is explained. FIG. 17 shows a procedure for registering the security information in the secure RAM 22. The CPU 11 determines a process to be executed in a user application (Step S81). For example, at Step S81, the CPU 11 determines a process, in a user application to be executed afterwards, which includes requesting the security IP 12 to execute the secure process. The CPU 11 notifies the security IP 12 about the process determined.

The process execution unit 21 (refer to FIG. 2) of the security IP 12 receives the notification transmitted from the CPU 11 through the CPU interface 25. Upon receiving the notification about the process to be executed from the CPU 11, the process execution unit 21 accesses the data flash 13, refers to the security information management table stored in the secure area 31, and determines the identification number Nm_Security_info_n of the security information to be registered in the secure RAM 22 (Step S82). In other words, the process execution unit 21 refers to the security information management table and identifies the identification number Nm_Security_info_n of the security information to be used in the security process when the process notified from the CPU 11 is executed.

The process execution unit 21 registers the identification information Nm_Security_info_n determined at Step S82 in the secure RAN 22 (Step S83). For example, when the identification numbers determines at Step S82 are '0' and '2', the process execution unit 21 stores these identification numbers in an area of the secure RAM 22 for storing the identification number Nm_Security_info_n. Further the process execution unit 21 acquires the security information Security_info_n corresponding to the identification number Nm_Security_info_n determined at Step S82 from the secure area 31 of the data flash 13 and registers it in the secure RAM 22 (Step S84). Note that either Step S83 or Step S84 may be carried out first.

It should be note that, in the above described example, an example in which the identification number Nm_Security_info_n and the security information Security_info_n are stored in the secure RAM 22 when the security IP 12 receives the notification about the process to be executed from the CPU 11 is explained. However, the present disclosure is not limited thereto. Similar to the first embodiment, the registration of the identification number Nm_Security_info_n and the registration of the security information Security_info_n may be carried out in separate procedures. That is, the security IP 12 may register the identification number Nm_Security_info_n in the secure RAM 22 upon receiving a notification of the process to be executed from the CPU 11, and then register the security information Security_info_n in the secure RAM 22 upon receiving an instruction for registering the security information.

Security Process

Figure 18:
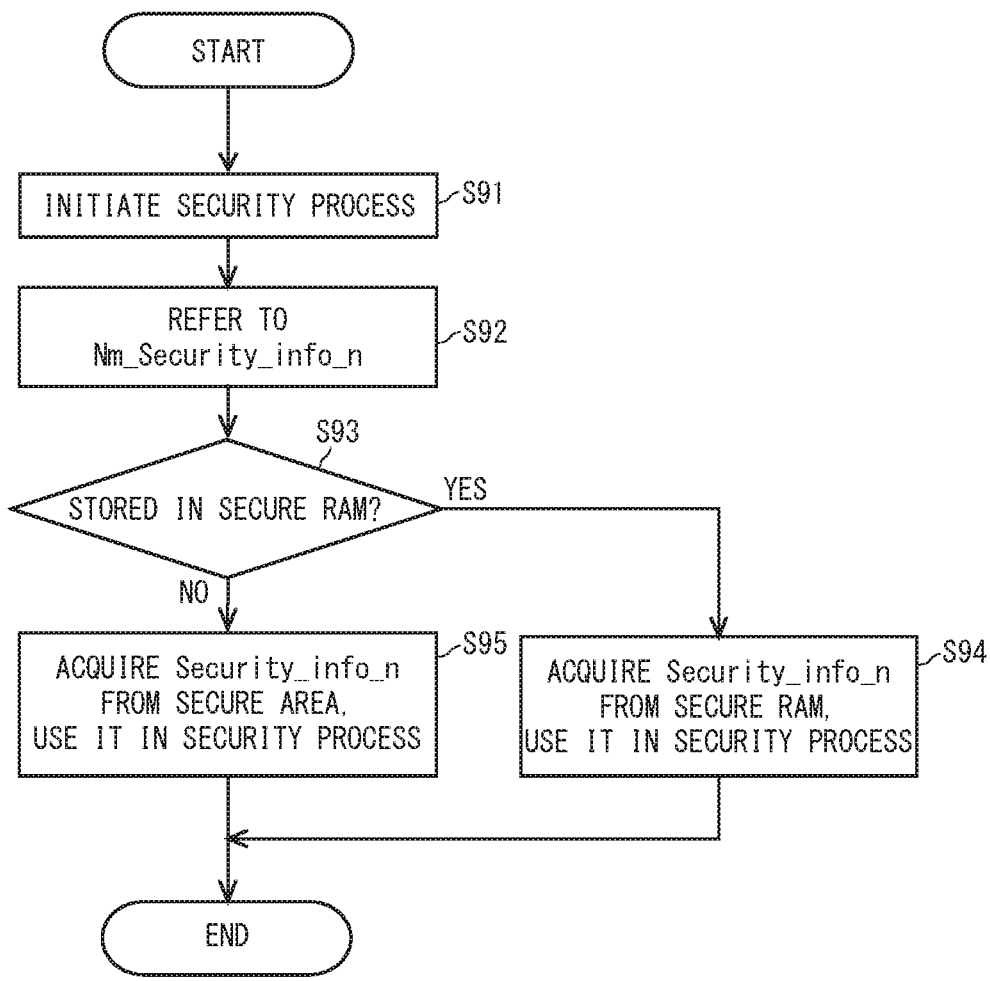
FIG. 18 is a flow chart showing a procedure for a security process.

Next, the security process is explained. FIG. 18 shows a procedure for the security process. A user application executed by the CPU 11 requests (instructs), in a given process, the security IP 12 to execute the security process. Upon receiving the instruction through the CPU interface 25, the process execution unit 21 of the security IP 12 initiates the security process instructed (Step S91).

When using the security information, the process execution unit 21 refers to the identification number Nm_Security_info_n of the secure RAM 22 (Step S92), and determines whether the security information to be used is registered in the secure RAM 22 or not (Step S93). When the process execution unit 21 determines that the security information is registered in the secure RAM 22, it acquires the security information Security_info_n from the secure RAM 22 and uses it in the security process (Step S94). When the process execution unit 21 determines that the security information to be used in the security process is not registered in the secure RAM 22, it accesses the data flash 13 through the flash interface 26, reads out the security information Security_info_n from the secure area 31, and uses it (Step S95).

It should be noted that although the above described modified embodiment is explained as a modification of the first, embodiment, the present disclosure is not limited thereto. The above described modified embodiment can be combined with the second embodiment and the third embodiment. Further, in the above described modified embodiment, an example in which the process is notified from the CPU 11 and the security IP 12 registers the security information corresponding to the notified process in the secure RAM 22. However, the present disclosure is not limited thereto. In the above described modified embodiment, similar to the first embodiment, the CPU 11 may designate the identification number of the security information to be registered in the secure RAM 22, and the security IP 12 may register the security information of the identification number designated in the secure RAM 22.

While the invention has been described in terms of several embodiments, those skilled in the art will recognize that the invention can be practiced with various modifications within the spirit and scope of the appended claims and the invention not limited to the examples described above.

Two or more of the above described embodiments can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. A security process execution method, comprising:
   receiving, from a central processing unit, a registration instruction to register a portion of a plurality of security information into a secure memory accessible from a security processing unit and not accessible from the central processing unit, the security processing unit configured to execute a security process using the security information;
   in response to receiving the registration instruction from the central processing unit, reading out, from a secure area of a non-volatile memory, the portion of a plurality of pieces of security information stored in the secure area, the non-volatile memory comprising the secure area and a user area which are logically dived, wherein the secure area being accessible from the security processing unit and not accessible from the central processing unit, the user area being accessible from both the security processing unit and the central processing unit;
   storing the read portion of the plurality of security information into the secure memory;
   initiating the security process upon receiving a request to execute the security process from the central processing unit;

checking whether the security information to be used in the security process is stored in the secure memory or not; and reading out the security information from the secure memory when the security information is stored in the secure memory and using the security information, wherein the security information includes key information used for encryption process or decryption process in the security process, and wherein the central processing unit accesses the user area for an operation of a user application while the security process is being executed such that the central processing unit accesses the user area for the operation of the user application after initiating the security process and before the security process finishes.

2. A semiconductor device comprising:

a security processing unit configured to execute a security process using security information;

a central processing unit configured to request the security processing unit to execute the security process;

a non-volatile memory including a secure area and a user area which are logically divided, the secure area being accessible from the security processing unit and not accessible from the central processing unit, the user area being accessible from both the security processing unit and the central processing unit; and a secure memory accessible from the security processing unit and not accessible from the central processing unit, wherein a plurality of pieces of security information to be used in the security process is stored in the secure area, wherein the security processing unit receives, from the central processing unit, a registration instruction to register a portion of the plurality of pieces of security information into the secure memory, wherein, in response to receiving the registration instruction, the security processing unit 1) reads the portion of the plurality of pieces of security information from the secure area and 2) stores the read portion of the plurality of pieces of security information to the secure memory, wherein when the registration of the portion of the plurality of pieces of security information in the secure memory finishes, the security processing unit receives, from the central processing unit, a request for executing the security process, wherein when the security processing unit receives the request for executing the security process from the central processing unit, the security processing unit 1) reads out the security information from the secure memory and 2) executes the security process using the security information read out from the secure memory, wherein the security information includes key information used for encryption process or decryption process in the security process, and wherein the central processing unit accesses the user area for an operation of a user application while the security processing unit is executing the security process such that the central processing unit accesses the user area for the operation of the user application after requesting the security processing unit to execute the security process and before the security process finishes.

3. The semiconductor device according to claim 2, wherein the central processing unit designates the security information to be stored in the secure memory to the security processing unit, and the security processing unit reads out the security information designated by the central processing unit from the secure area and stores the security information in the secure memory based on the registration instruction from the central processing unit.

4. The semiconductor device according to claim 3, wherein the central processing unit designates the security information in an initial setting operation.

5. The semiconductor device according to claim 2, wherein identification information of the security information to be stored in the secure memory is further stored in the secure area, and the security processing unit reads out the identification information from the secure area, reads out the security information corresponding to the identification information read out, and stores the security information in the secure memory.

6. The semiconductor device according to claim 5, wherein the security processing unit reads out the identification information from the secure area in an initial setting operation.

7. The semiconductor device according to claim 2, wherein the security processing unit further stores, in the secure memory, identification information of the security information to be stored in the secure memory.

8. The semiconductor device according to claim 7, wherein the security processing unit stores the identification information in the secure memory before storing the security information in the secure memory, reads out, from the secure area, the security information corresponding to the identification information stored in the secure memory, and stores the security information in the secure memory.

9. The semiconductor device according to claim 7, wherein the security processing unit stores the security information in the secure memory as a first storage type, associates the identification information with information indicating that a type of storage of the security information in the secure memory is the first storage type, and stores the identification information in the secure memory.

10. The semiconductor device according to claim 9, wherein the security processing unit reads out the security information not stored in the secure memory from the secure area and uses the security information during executing the security process, further stores the security information read out in the secure memory as a second storage type, associates the identification information of the security information stored with information indicating that a type of storage of the security information in the secure memory is the second storage type, and stores the identification information in the secure memory.

11. The semiconductor device according to claim 10, wherein the secure memory comprises a plurality of slots for storing the security information, and a predetermined number of the slots among the plurality of the slots are used for storing the security information as the first storage type and remaining slots are used for storing the security information as the second storage type.

12. The semiconductor device according to claim 11, wherein when storing the security information in the secure memory as the second storage type and when there is no empty slot for storing the security information as the second storage type in the secure memory, the security processing unit overwrites the security information in a slot in which the security information is already stored as the second storage type.

13. The semiconductor device according to claim 2, wherein the central processing unit notifies the security processing unit about a process, included in an application executed by the central processing unit, which includes the request for executing the security process, the security processing unit refers to a security information management table managing relationship between the process and the security information to be used in the security processing unit when the process is executed, identifies the security information to be used in the security processing unit when the process notified is executed, reads out the security information identified from the secure area, and stores the security information in the secure memory.

14. The semiconductor device according to claim 2, wherein the security processing unit reads out a program from the secure area and executes the security processing according to the program using the security information stored in the secure memory.

15. A security process execution device, comprising:

a first interface configured to communicate with a central processing unit;

a second interface configured to access a non-volatile memory accessible from the central processing unit in common;

a security process execution unit configured to execute a security process using security information; and a secure memory accessible from the security process execution unit and not accessible from the central processing unit, wherein the security process execution unit is accessible to the non-volatile memory through the second interface, wherein the non-volatile memory comprises a secure area and a user area which are logically divided, the secure area being accessible from the security process execution unit and not accessible from the central processing unit, and the user area being accessible from both the security process execution unit and the central processing unit, wherein a plurality of pieces of the security information to be used in the security process is stored in the secure area, wherein the security process execution unit receives, from the central processing unit, a registration instruction to register a portion of the plurality of pieces of security information into the secure memory, wherein, in response to receiving the registration instruction, the security process execution unit 1) reads out the portion of the plurality of pieces of security information from the secure area through the second interface and 2) stores the read portion of the plurality of pieces of security information in the secure memory, wherein when the registration of the portion of the plurality of pieces of security information in the secure memory finishes, the security process execution unit receives a request for executing the security process from the central processing unit, wherein when the security process execution unit receives the request for executing the security process from the central processing unit, the security process execution unit 1) reads out the security information from the secure memory and 2) executes the security process using the security information read out from the secure memory, wherein the security information includes key information used for encryption process or description process in the security process, and wherein the central processing unit accesses the user area for an operation of a user application while the security process execution unit is executing the security process such that the central processing unit accesses the user area for the operation of the user application after requesting the security process execution unit to execute the security process and before the security process finishes.

* * * * *